US008261860B2

(12) United States Patent
Najt et al.

(10) Patent No.: US 8,261,860 B2
(45) Date of Patent: Sep. 11, 2012

(54) HYBRID POWERTRAIN SYSTEM USING FREE PISTON LINEAR ALTERNATOR ENGINES

(75) Inventors: Paul M. Najt, Bloomfield Hills, MI (US); Tang-Wei Kuo, Troy, MI (US); Rodney B. Rask, Grosse Pointe Woods, MI (US); Aristotelis Babajimopoulos, Ann Arbor, MI (US); Zoran S. Filipi, Ann Arbor, MI (US); George Lavoie, Ann Arbor, MI (US); Dionissios N. Assanis, Ann Arbor, MI (US)

(73) Assignees: GM Global Technology Operations LLC, Detroit, MI (US); The Regents of the Univeristy of Michigan, Ann Arbor, MI (US)

( * ) Notice: Subject to any disclaimer, the term of this patent is extended or adjusted under 35 U.S.C. 154(b) by 506 days.

(21) Appl. No.: 12/504,502

(22) Filed: Jul. 16, 2009

(65) Prior Publication Data
US 2011/0011660 A1   Jan. 20, 2011

(51) Int. Cl.
*B60W 10/04* (2006.01)
(52) U.S. Cl. .................................. 180/65.21; 123/46 E
(58) Field of Classification Search .................. 180/65.2, 180/65.21; 123/46 E
See application file for complete search history.

(56) References Cited

U.S. PATENT DOCUMENTS

| | | | | |
|---|---|---|---|---|
| 4,924,956 A * | 5/1990 | Deng et al. | ............... | 180/65.245 |
| 5,172,784 A * | 12/1992 | Varela, Jr. | ............... | 180/65.245 |
| 6,199,519 B1 | 3/2001 | Van Blarigan | | |
| 6,532,916 B2 * | 3/2003 | Kerrebrock | ................. | 123/46 E |
| 6,541,875 B1 * | 4/2003 | Berlinger et al. | ............. | 290/1 R |
| 6,748,907 B2 | 6/2004 | Malmquist et al. | | |
| 6,759,755 B2 * | 7/2004 | Sagov | .......................... | 290/1 R |
| 7,178,616 B2 * | 2/2007 | Botti et al. | .................... | 180/65.1 |
| 7,258,085 B2 * | 8/2007 | Niiyama et al. | ............ | 123/46 R |
| 7,332,825 B2 * | 2/2008 | Annen et al. | .................. | 290/1 A |
| 7,426,910 B2 * | 9/2008 | Elwart | ........................ | 123/46 E |
| 7,701,075 B2 * | 4/2010 | Holliday | .................... | 290/40 C |
| 7,721,686 B2 * | 5/2010 | Lindgarde | ................... | 123/46 R |
| 7,845,317 B2 * | 12/2010 | Max et al. | ................... | 123/46 E |
| 2002/0139323 A1 * | 10/2002 | Kerrebrock | ................. | 123/46 E |
| 2003/0024492 A1 * | 2/2003 | Malmquist et al. | ......... | 123/46 E |
| 2005/0081804 A1 * | 4/2005 | Graf et al. | ................... | 123/46 E |
| 2005/0103287 A1 * | 5/2005 | Hofbauer | ..................... | 123/46 E |
| 2005/0109295 A1 * | 5/2005 | Kaneko et al. | ............. | 123/46 E |
| 2005/0257757 A1 * | 11/2005 | Kemper et al. | ............. | 123/46 E |
| 2008/0098972 A1 * | 5/2008 | Elwart | ................... | 123/142.5 E |
| 2008/0223631 A1 * | 9/2008 | Filla et al. | .................... | 180/65.1 |
| 2008/0271711 A1 * | 11/2008 | Cheeseman | ................. | 123/46 E |

FOREIGN PATENT DOCUMENTS

WO   WO 2004/025098 A1   3/2004

* cited by examiner

*Primary Examiner* — Katy M Ebner

(57) ABSTRACT

A hybrid powertrain system includes reciprocating free-piston internal combustion engines, each including a linear alternator device configured to generate electric power. A control module determines mechanical and electrical power demands responsive to an operator torque request and a state of charge of an energy storage device. The control module operates the torque machine to generate an output torque responsive to the mechanical power demands and operates the reciprocating free-piston internal combustion engines to generate electric power responsive to the electrical power demands.

19 Claims, 6 Drawing Sheets

HYBRID POWERTRAIN SYSTEM USING FREE PISTON LINEAR ALTERNATOR ENGINES

TECHNICAL FIELD

This disclosure relates to hybrid powertrain systems.

BACKGROUND

The statements in this section merely provide background information related to the present disclosure and may not constitute prior art.

Vehicles use powertrain systems to generate and transfer tractive torque to an output member. Known hybrid powertrain systems for motor vehicles include internal combustion engines and torque machines that transfer tractive torque to one or more drive wheel(s), including transferring torque through a transmission device to the output member coupled to a driveline. One known hybrid powertrain system includes electric machines configured to operate as torque motors and electric power generators that exchange electric power with an electrical energy storage device.

Hybrid powertrain systems include internal combustion engines mechanically coupled in series with one or more torque machines, including range-extended electric vehicles and plug-in hybrid electric vehicles that use electric power for propulsion.

One known internal combustion engine includes a reciprocating internal combustion engine having two opposing cylinders with a double-ended free piston oscillating therein. The double-ended free piston in the opposing cylinders forms two variable volume combustion chambers. The opposing cylinders can have a linear electrical alternator integrated therein, and the double-ended free piston includes a plurality of permanent magnets. When the free piston oscillates in the two opposing cylinders during operation of the engine, electrical energy is generated that can be used to power a torque machine or can be stored in an electrical energy storage device. The operation thus directly converts chemical energy in the form of engine fuel to electrical energy and power.

SUMMARY

A hybrid powertrain system includes an electrical energy storage device and an electrically-powered torque machine. The electrically-powered torque machine generates torque transferable to a driveline and reacts torque from the driveline. The hybrid powertrain includes a plurality of reciprocating free-piston internal combustion engines, each including a linear alternator device configured to generate electric power. A power electronics circuit is configured to transfer electric power between each of the linear alternator devices, the electrical energy storage device and the torque machine. A control module is configured to determine mechanical and electrical power demands responsive to an operator torque request and a state of charge of the electrical energy storage device. The control module commands operations of the reciprocating free-piston internal combustion engines to generate electric power responsive to the electrical power demands.

BRIEF DESCRIPTION OF THE DRAWINGS

One or more embodiments will now be described, by way of example, with reference to the accompanying drawings, in which.

DETAILED DESCRIPTION

Figure 1:
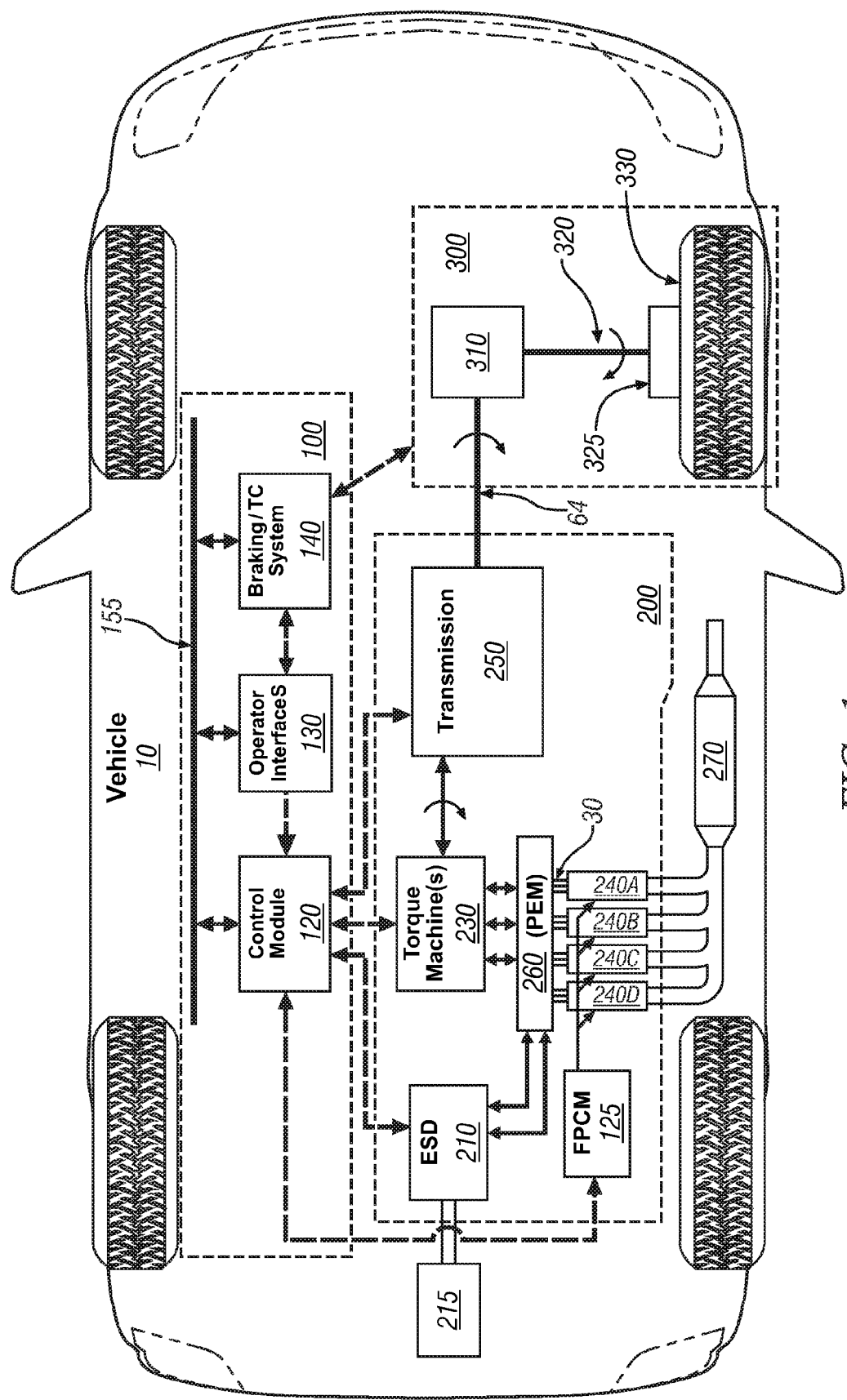
FIGS. 1, 2, and 3 are two-dimensional schematic diagrams of powertrain systems in accordance with the present disclosure.

Referring now to the drawings, wherein the showings are for the purpose of illustrating certain exemplary embodiments only and not for the purpose of limiting the same, FIG. 1 schematically shows a vehicle 10 including a control system 100, a hybrid powertrain system 200, and a driveline 300.

The hybrid powertrain system 200 includes a plurality of reciprocating free-piston internal combustion engines each including a linear alternator device (FPLA) 240. The hybrid powertrain system includes at least one electrically-powered torque machine(s) 230, a power electronics module (PEM) 260, an electrical energy storage device (ESD) 210, and a torque transmission device 250 in one embodiment. The FPLAs 240 include four devices in one embodiment (as shown), depicted as 240A, 240B, 240C, and 240D. The FPLAs 240A, 240B, 240C, and 240D generate output power in the form of electric power. Each of the FPLAs 240A, 240B, 240C, and 240D transfers its electric power to the power electronics module 260 via a plurality of electrical cables 30. The quantity of electric cables 30 corresponds to the number of phases of the linear alternator device of each FPLA 240. The power electronics module 260 is electrically connected to the torque machine(s) 230 and the electrical energy storage device 210.

The energy storage device (ESD) 210 preferably includes a high-voltage electrical energy storage device, and can include a plurality of lithium-ion battery cells connected in series and having a nominal rating of 324 V in one embodiment. In operation, a preferred battery state-of-charge (SOC) range is between 0.3 and 0.8.

In one embodiment, the ESD 210 connects to a plug-in module 215 that is connectable to externally available electric power via a charging outlet when the vehicle 10 is stationary. When the plug-in module 215 is connected to the externally available electric power, it converts the electric power to electrically charge the ESD 210.

The torque machine(s) 230 include electric motor/generators that convert electrical power to mechanical power and convert mechanical power to electrical power that can be stored in the ESD 210. In one embodiment, the torque machine(s) 230 includes two electric motors, each characterized in terms of rotational speed, torque output and efficiency levels associated with the speed and torque outputs. The torque machine(s) 230 operate as motors that use electrical power to generate mechanical power in the form of tractive torque to drive the vehicle 10. The torque machine(s) 230 operate as generators that use electrical power to react mechanical power in the form of vehicle braking via tractive torque to recuperate vehicle kinetic energy.

The power electronics module 260 includes a plurality of controllable power inverter(s) including power transistors configured and controlled to transform electric power between alternating electrical current and direct electrical current. Electric power is transferred between the power electronics module 260, the FPLAs 240, the ESD 210, and the torque machine(s) 230 via high-voltage electrical buses.

Each FPLA 240 preferably includes a modular resonant machine including a reciprocating free-piston internal combustion engine having a single cylinder with a double-ended free piston oscillating therein. The double-ended free piston in the single cylinder forms two variable volume combustion chambers. The cylinder has a linear electrical alternator including a plurality of electrical coils and iron stators integrated therein, and the double-ended free piston includes a plurality of permanent magnets. When the free piston oscillates in the cylinder during operation, electrical energy is generated by the action of the permanent magnets forming and breaking magnetic fields with the iron stators and electrical coils in accordance with electromagnetic principles. Output power from each FPLA 240 is in the form of electrical power and can be used to power an electrically-powered torque machine, e.g., electrically-powered torque machine(s) 230, or can be stored in an electrical energy storage device, e.g., electrical energy storage device (ESD) 210.

Figure 4:
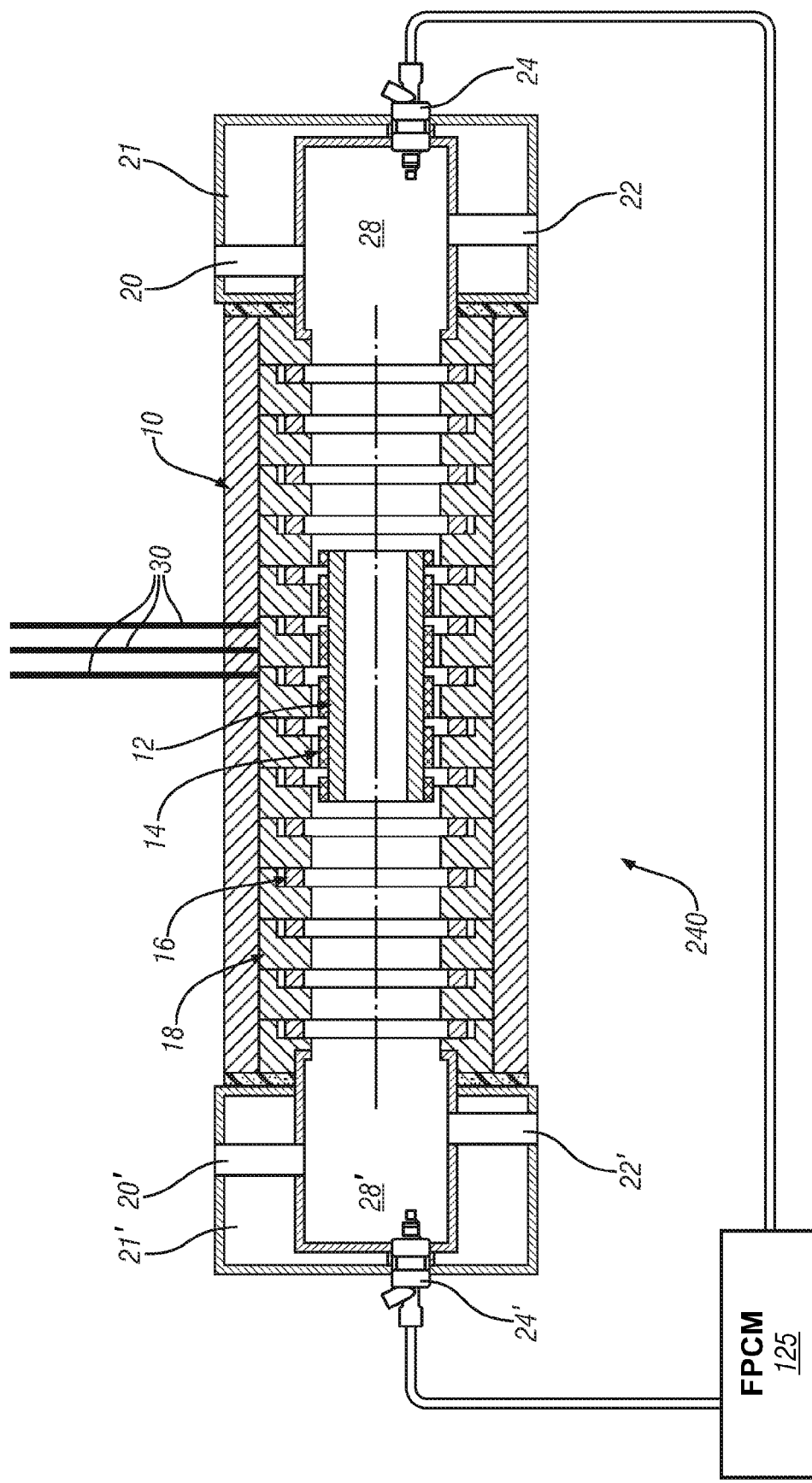
FIG. 4 is a two-dimensional schematic diagram of an exemplary engine in accordance with the present disclosure.

FIG. 4 schematically shows a 2-dimensional view of an exemplary FPLA 240, including a single cylinder 10 including a non-ferrous metallic shell. A linear electrical alternator is formed therein, including an annular iron stator 18 having a plurality of annular electrical coils 16 placed therein and a piston 12. The electrical coils 16 are annular to a longitudinal axis of the cylinder 10 and spaced along the longitudinal axis in conjunction with the iron stator 18. The piston 12 includes a single double-ended free device including a plurality of permanent magnets 14. The piston 12 is inserted within the annular iron stator 18 and the plurality of electrical coils 16. A first end of the cylinder 10 is capped with a first head portion 21 that includes an intake valve 20, an exhaust valve 22, and a fuel injector 24. A second end of the cylinder 10 is capped with a second head portion 21' that includes an intake valve 20', an exhaust valve 22', and a fuel injector 24'. The cylinder 10, piston 12 and the first head portion 21 form a first variable displacement combustion chamber 28. The cylinder 10, piston 12 and the second head portion 21' form a second variable displacement combustion chamber 28'. In one embodiment, the intake valves 20, 20' and exhaust valves 22, 22' are slot valves that open and close by movement of the piston 12 in the single cylinder 10.

Each FPLA 240 combusts injected fuel to move the piston 12 within the single cylinder 10 using one or more combustion processes. Each FPLA 240 is configured to operate in a two-stroke combustion cycle using a homogeneous-charge compression-ignition combustion mode in one embodiment. Each FPLA 240 can operate over a range of compression ratios to accommodate varying fuel compositions and achieve preferred thermal and fuel efficiency levels.

Fuel can include gasoline blends, and alcohol blended hydrocarbon fuel grades. Ethanol blended hydrocarbon fuels can include higher ethanol blends (e.g. E80, E85), and neat ethanol (E99). Alternatively, any alcohol including one to five atoms of carbon may be used including any one of methyl alcohol, ethyl alcohol, n propyl alcohol, iso-propyl alcohol, n butyl alcohol, sec. butyl alcohol, iso-butyl alcohol, tert. butyl alcohol, n amyl alcohol, sec. amyl alcohol, prim. iso-amyl alcohol, sec. iso-amyl alcohol, amyl alcohol, tert. amyl alcohol and light ethanol blends thereof are preferred fuels; however, alternative liquid and gaseous fuels such as neat methanol (M100), natural gas, hydrogen, biogas, various reformates, syngases, and others may be used in the implementation in accordance with the present disclosure.

Each FPLA 240 is operates in an engine-on (ON) state and an engine-off (OFF) state. Each FPLA 240 has at least one resonant operating speed corresponding to mass of the piston 12 and length of the cylinder 10 at which it generates a preferred output power, e.g., a maximum output power or an output power achieved at a maximum efficiency point. The preferred output power is referred to as a rated output power at the resonant operating speed. In one embodiment, each FPLA 240 operates at a resonant speed and at a fixed output power, e.g., a rated output power of 30 kW. Alternatively, each of the FPLAs 240 has the same rated output power, e.g., of 30 kW, and operates at one of a plurality of output powers, e.g., 10 kW, 20 kW, and 30 kW preferably at the resonant speed, the output power controlled by controlling mass of fuel injected each combustion cycle. Alternatively, each FPLA 240 has the same rated output power, e.g., of 30 kW, and operates over a range of output powers from a minimum output power to the rated output power, e.g., between 0 kW and the rated output power of 30 kW, with the output power controlled by controlling the mass of fuel injected each combustion cycle. In one embodiment, each FPLA 240 operates at the rated output power to generate the same amount of power, e.g., 30 kW, with a total output power of 120 kW when four FPLAs 240 are used. In one embodiment, the FPLAs 240 have different rated output powers, and generate different, preferably progressive amounts of output power in the engine-on state. The FPLAs 240 can be configured to generate different rated output powers by varying engine design factors including bore and stroke of the cylinder 10, size and mass of the piston 12, and other factors. Thus, in one embodiment the first FPLA 240A can have a rated output power of 10 kW, the second FPLA 240B can have a rated output power of 20 kW, the third FPLA can have a rated output power of 30 kW, and the fourth FPLA 240D can have a rated output power of 40 kW for a total rated output power of 100 kW of power for the combined operation of the FPLAs 240A, 240B, 240C, and 240D. The numerical values for the rated output power generated by the FPLAs 240 are illustrative and not restrictive.

An exhaust aftertreatment system 270 is configured to treat an exhaust gas feedstream generated during combustion in all the FPLAs 240 consistent with the engine configuration and the combustion mode, e.g., the combustion process(es), potential air/fuel ratio operating regime(s), and other factors.

In one embodiment, the transmission 250 includes differential gearing and selectively applied torque-transfer clutches to transfer power between the torque machine(s) 230 and the driveline 300 in one of a plurality of range states. Mechanical power from the torque machine(s) 230 can be transferred to the transmission 250 via an output member 64 to the driveline 300 for tractive power. Mechanical power from the driveline 300 can be transferred to the torque machine(s) 230 via the transmission 250.

The torque machine(s) 230, FPLAs 240 and transmission 250 each include sensing devices for monitoring operation thereof. The torque machine(s) 230, FPLAs 240 and transmission 250 include a plurality of actuators for controlling operation thereof.

Figure 2:
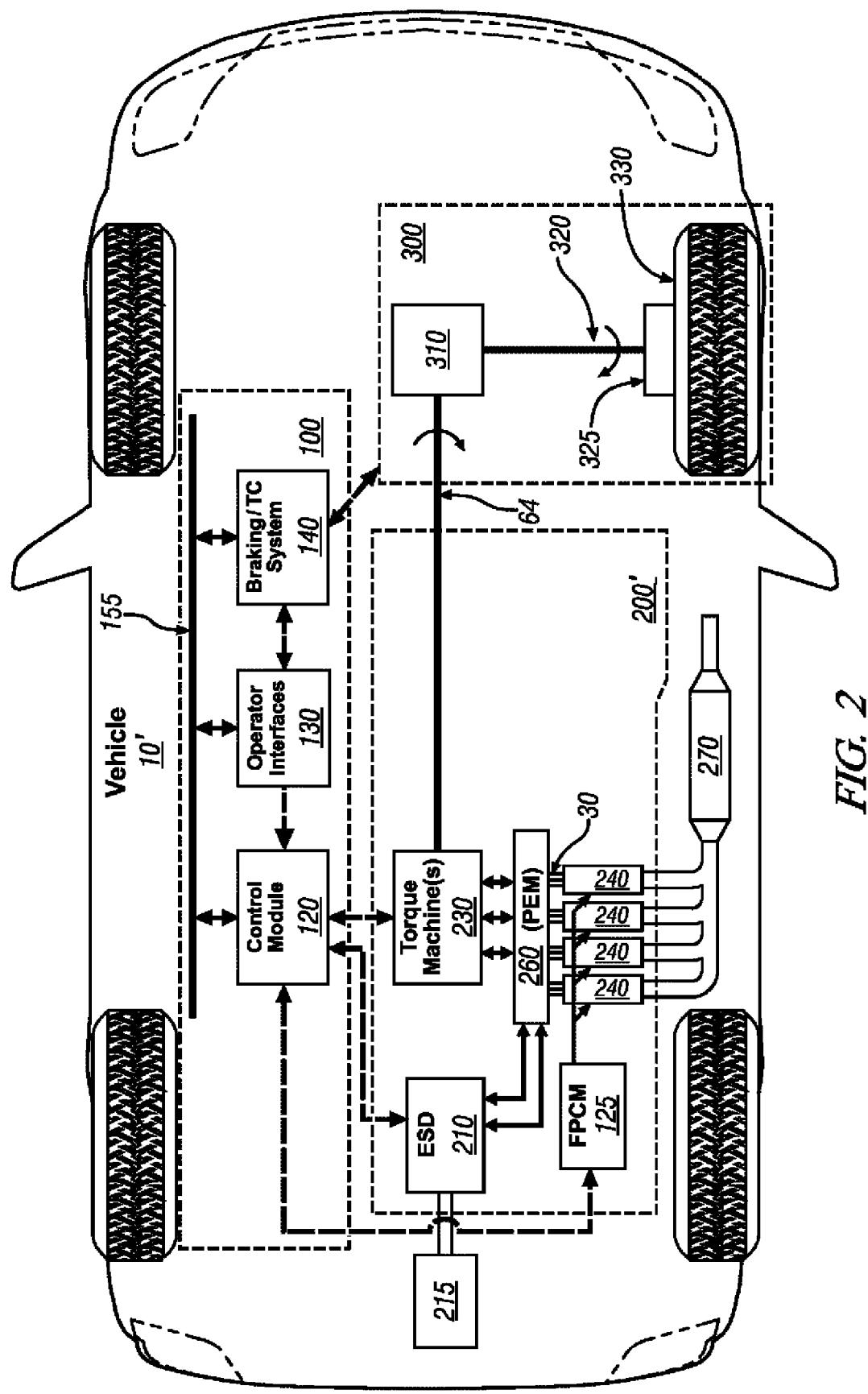
Figure 3:
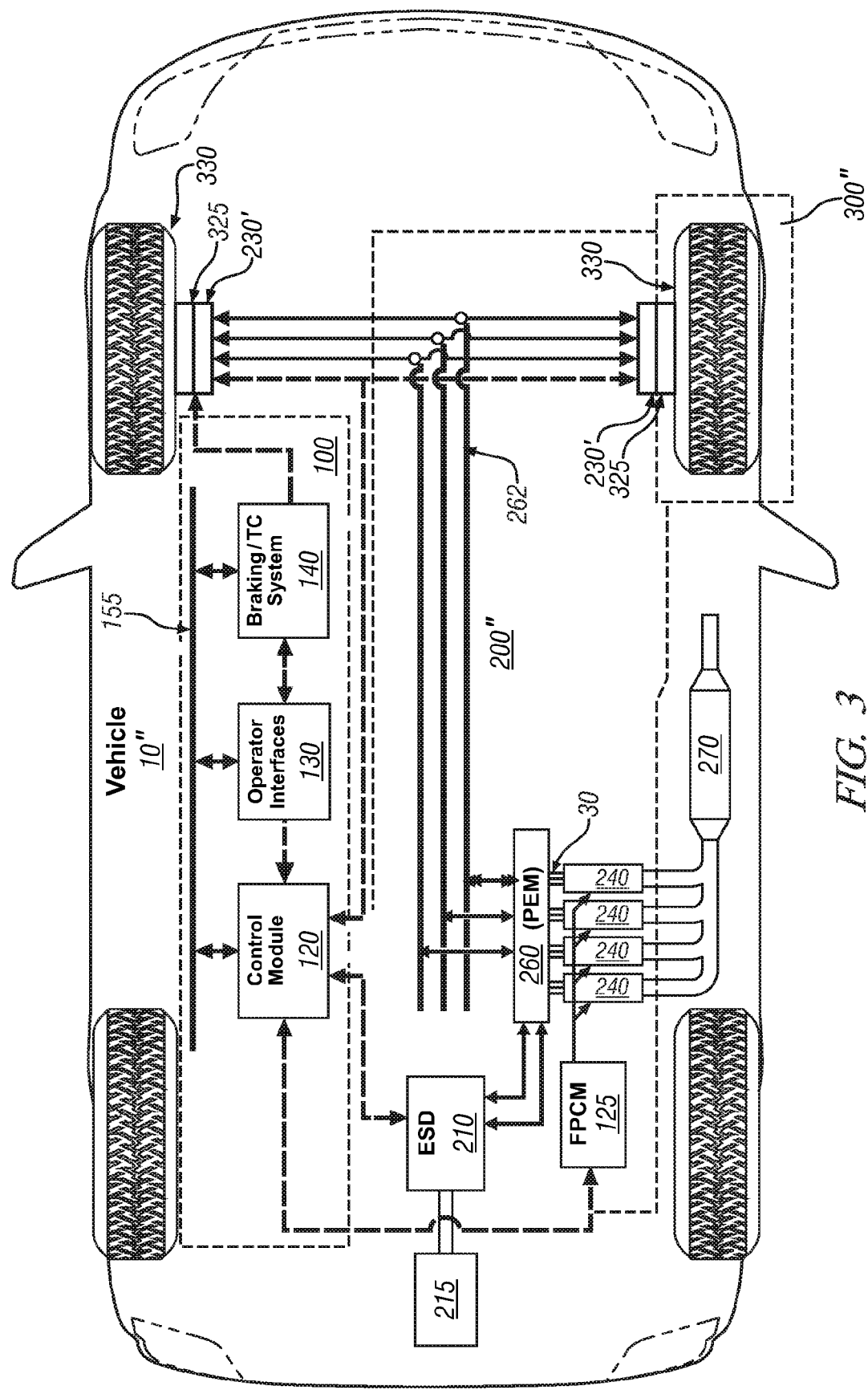

The driveline 300 shown in FIG. 1 can include a differential gear device 310 that mechanically couples to an axle 320 or half-shaft that mechanically couples to a wheel 330 having a brake device 325 in one embodiment. The differential gear device 310 is coupled to the output member 64. The driveline 300 transfers tractive power between the hybrid transmission 250 and a road surface. FIG. 2 shows another embodiment of the hybrid powertrain system 200' including the plurality of FPLAs 240, torque machine(s) 230, power electronics module 260, and the electrical energy storage device 210. The torque machine(s) 230 directly connect to the driveline 300 via output member 64 to transfer torque, without an intermediate transmission device. FIG. 3 shows another embodiment of the hybrid powertrain system 200" including the plurality of FPLAs 240, the power electronics module 260, and the electrical energy storage device 210. In this embodiment each torque machine 230' includes a wheel motor that directly connects to driveline 300" including one of the vehicle wheels 330 including a brake device 325. A high power electric bus 262 is used to transfer electric power between each of the torque machines 230' and the power electronics module 260 in response to control signals from the control module 120.

The control system 100 includes a control module 120 and operator interfaces 130. Preferably a braking and traction control (Braking/TC) system 140 is configured to communicate information in the form of sensor data and control signals via a communications bus 155. The operator interface 130 includes a plurality of human/machine interface devices through which the vehicle operator commands operation of the vehicle 10, including an accelerator pedal, a brake pedal, and a transmission range selector (PRNDL), none of which are separately illustrated. The operator interface 130 preferably communicates directly with the control module 120 and the braking and traction control system 140. The vehicle operator communicates commands, e.g., an output torque command including an operator torque request, a direction of vehicle travel, i.e., forward or reverse, and a preferred range state for the transmission 250 where applicable through the accelerator pedal, the brake pedal, and the transmission range selector. The braking and traction control system 140 includes, for example, yaw rate sensors, wheel speed sensors, vehicle speed sensors, and control schemes to manage and control vehicle braking, traction control and stability during operation.

The control module 120 is signally connected to sensing devices of each of the torque machine(s) 230, the transmission 250, and the ESD 210 to monitor operation and determine parametric states thereof. Monitored states of the ESD 210 preferably include instantaneous current flow and temperature of the ESD 210. The control module 120 determines parametric states of the ESD 210 indicative of the capacity of the ESD 210 to transfer power to the torque machine(s) 230. The parametric states of the ESD 210 include a state-of-charge (SOC), and maximum and minimum power limits.

Monitored states of the transmission 250, in embodiments so equipped, preferably include rotational speeds and hydraulic pressure at a plurality of locations from which parametric states including application of specific torque transfer clutches can be determined. Monitored states of the torque machine(s) 230 preferably include speed(s) and power flow(s), e.g., electric current flow, from which a parametric state for motor torque(s) output from the torque machine(s) 230 can be determined.

The control module 120 operatively connects to the actuators of each of the torque machine(s) 230 and the transmission 250 to control operation thereof in accordance with executed control schemes that are stored in the form of algorithms and calibrations. The actuators associated with the transmission 250 include solenoid devices for actuating torque transfer clutches to effect operation in specific range states. The control module 120 is operatively connected to power transistors, e.g. IGBTs, of the power electronics module 260 to control electric power transfer therethrough.

In operation, the control module 120 executes algorithmic code to determine mechanical and electrical power demands responsive to an operator torque request and a state of charge of the electrical energy storage device. The control module 120 commands operation of the torque machine(s) 230 and the PEM 260 to generate an output torque responsive to the mechanical power demands. The control module 120 signally connects to a second control module (FPCM) 125 to control operation of the FPLAs 240 to generate electric power responsive to the electrical power demands. The second control module (FPCM) 125 is signally and operatively connected to each of the FPLAs 240A, 240B, 240C, and 240D to monitor operating states and control operation thereof. Monitored operating states of the FPLAs 240 may include engine speed, load, or temperature. The actuators associated with each FPLA 240 preferably include, e.g., fuel injectors, air flow controllers, and other known devices associated with controlling operation of each of the FPLAs 240A, 240B, 240C, and 240D, including controlling the engine states to one of the engine-on state and the engine-off state. The preferred mechanical power demands are associated with an operator torque request, and include preferred torque output(s) from the torque machine(s) 230 responsive to the operator torque request. The electrical power demands are associated with a present state of charge of the ESD 210 relative to a preferred state of charge for the ESD 210 and the preferred mechanical power demands, taking into account mechanical efficiencies, electrical power transmission losses, and other factors.

The control module 120 preferably includes one or more general-purpose digital computers, each including a microprocessor or central processing unit, storage mediums including read only memory (ROM), random access memory (RAM), electrically programmable read only memory (EPROM), a high speed clock, analog to digital (A/D) and digital to analog (D/A) circuitry, and input/output circuitry and devices (I/O) and appropriate signal conditioning and buffer circuitry. The control module 120 has a set of control algorithms, including resident program instructions and calibrations stored in one of the storage mediums and executed to provide desired functions. Information transfer to and from the control module 120 can be accomplished by way of a direct connection, a local area network bus and a serial peripheral interface bus. The algorithms of the control schemes are executed during preset loop cycles such that each algorithm is executed at least once each loop cycle. Algorithms stored in the non-volatile memory devices are executed by the central processing unit to monitor inputs from the sensing devices and execute control and diagnostic routines to control operation of actuators associated with elements of the hybrid powertrain system 200 using calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The control module 120 is configured to execute at least one of a plurality of power management strategies to transfer electric power between the torque machine(s) 230, the electrical energy storage device (ESD) 210, and the FPLAs 240 to generate tractive torque using the torque machine(s) 230 and the driveline 300 in response to an operator torque request. The power management strategies include machine-executable algorithms and calibrations that monitor inputs and execute decision logic to control actuators.

Figure 5:
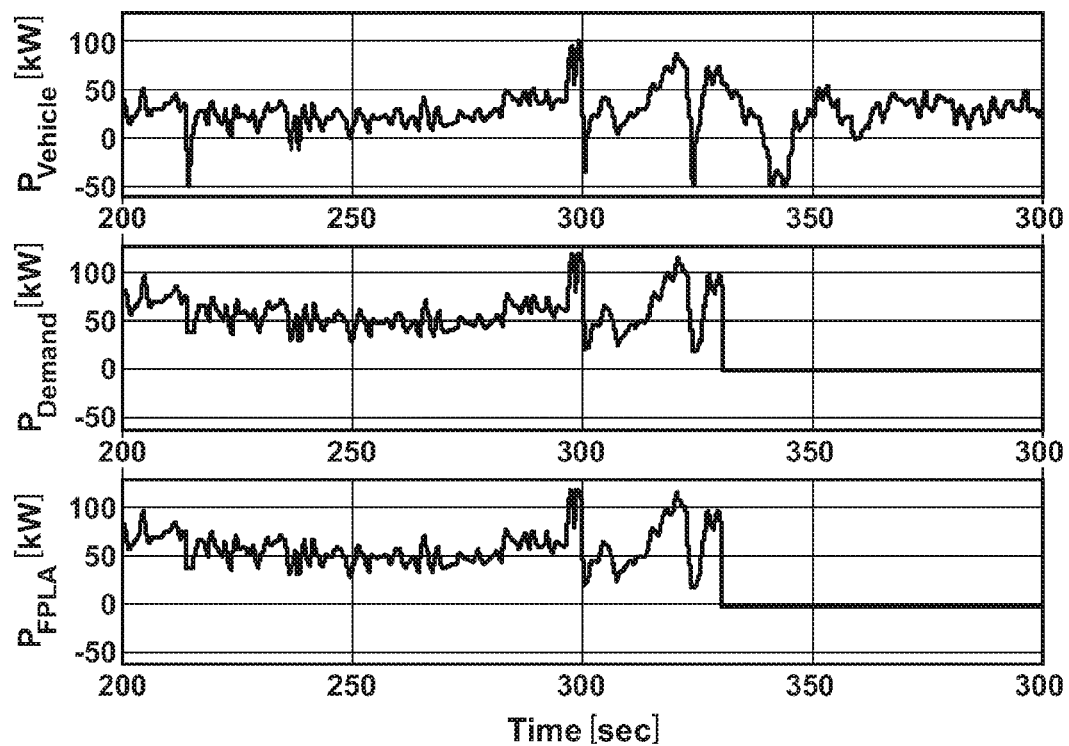
FIGS. 5-8 are graphical depictions of operating results for an exemplary powertrain system in accordance with the present disclosure.

A first power management strategy for operating the powertrain system 200 to generate tractive torque responsive to an operator torque request to achieve an instantaneous power demand includes operating each of the FPLAs 240 over a range of output powers from a minimum to a maximum output power, with the output power controlled by controlling the injected fuel mass during each combustion cycle to each of the FPLAs. In one embodiment of the powertrain system 200 described herein with FPLAs 240A, 240B, 240C, and 240D each have a rated output power of 30 kW of power, the output power from the FPLAs 240 being continuously variable from 0 kW to 120 kW. Thus, as shown with reference to FIG. 5, the total output power from the FPLAs 240 ($P_{FPLA}$) closely tracks the operator torque request ($P_{Demand}$), with the output power to the vehicle ($P_{Vehicle}$) adjusted based upon efficiencies of the torque machine(s) 230. When the powertrain system 200 is configured to operate primarily using the first power management strategy, the ESD 210 can be sized at an appropriate charge capacity (Ah) with minimal need for excess charge capacity associated with charging and discharging since most of the instantaneous power demand is achieved directly using the FPLAs 240 responsive thereto.

Figure 6:
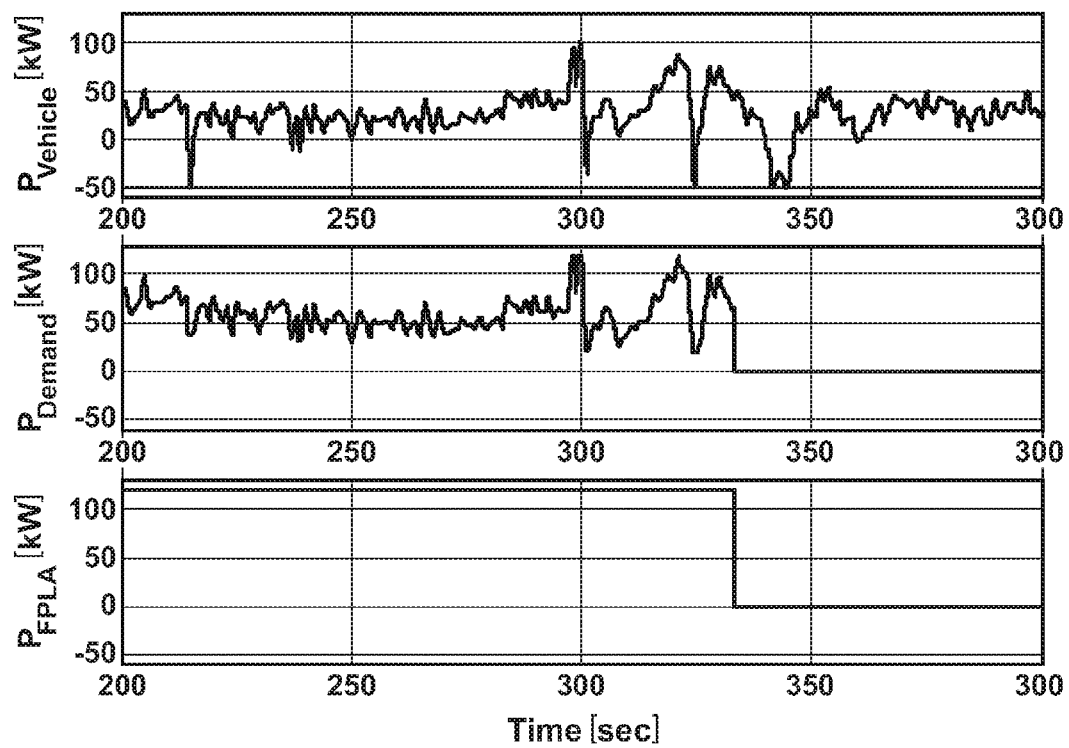

A second power management strategy for operating the powertrain system 200 to generate tractive torque to achieve an instantaneous power demand that is responsive to an operator torque request includes operating the powertrain system 200 with all of the FPLAs 240 operating in one of the engine-on (ON) state and the engine-off (OFF) state. Preferably each of the FPLAs 240 operates at its resonant speed and at its rated output power, e.g., 30 kW in one embodiment. Thus the FPLAs 240 generate a maximum electrical output power, e.g., 120 kW in the engine-on state, and at zero output power in the engine-off state. The generated electrical power powers the torque machine(s) 230 to generate tractive torque, charges the ESD 210, or is dissipated. The second power management strategy may be used in conjunction with a vehicle intended for extended range electric vehicle operation or plug-in hybrid vehicle operation. The ESD 210 can be sized at an appropriate charge capacity (Ah) with a large charge capacity since most of the instantaneous power demand is achieved using the ESD 210. The FPLAs 240 provide backup power when the state of charge of the ESD 210 approaches a minimum charge level. Alternatively, when the vehicle is intended to primarily operate in a hybrid operating mode, the ESD 210 can be sized at an appropriate charge capacity (Ah) with a small charge capacity since the instantaneous power demand is achieved using the FPLAs 240. Thus, as shown with reference to FIG. 6, the total output power from the FPLAs 240 ($P_{FPLA}$) does not track the operator torque request ($P_{Demand}$), with the output power to the vehicle ($P_{Vehicle}$) adjusted based upon efficiencies of the torque machine(s) 230.

A third power management strategy for operating the powertrain system 200 to generate tractive torque to achieve an instantaneous power demand that is responsive to an operator torque request includes operating each of the FPLAs 240 of the powertrain system 200 in one of the engine-on (ON) state and the engine-off (OFF) state, with each of the FPLAs 240 operating at its resonant speed at its rated output power, e.g., 30 kW in one embodiment. Thus, in one embodiment each of the FPLAs 240A, 240B, 240C, and 240D operates in one of the engine-on (ON) state and the engine-off (OFF) state, and each of the FPLAs 240A, 240B, 240C, and 240D generates the same rated output power, e.g., 30 kW when operating. There is a corresponding output power of 0 kW when all of the FPLAs 240 are in the engine-off state, a corresponding output power of 30 kW when one of the FPLAs 240 is in the engine-on state, a corresponding output power of 60 kW when two of the FPLAs 240 are in the engine-on state, a corresponding output power of 90 kW when three of the FPLAs 240 are in the engine-on state, and a corresponding output power of 120 kW when all of the FPLAs 240 are in the engine-on state.

Figure 7:
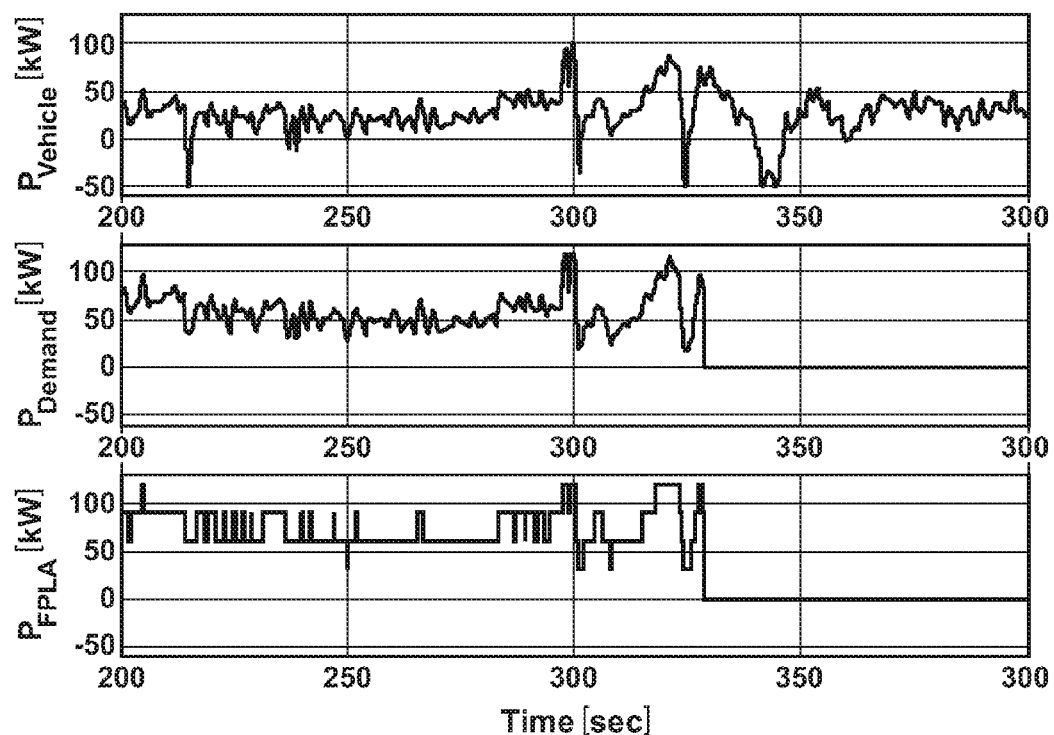

FIG. 7 shows operation of the powertrain system 200 using a first subset of the third power management strategy, wherein the number of FPLAs 240 in the engine-on state is determined based upon the operator torque request ($P_{Demand}$), with the total output electric power output from the operating FPLAs 240 ($P_{FPLA}$) is controlled to be greater than the required mechanical power associated with the operator torque request ($P_{Demand}$), with the output power to the vehicle ($P_{Vehicle}$) adjusted based upon efficiencies of the torque machine(s) 230 in converting electrical power to mechanical power. The excess power generated by the operating FPLAs 240 is used to charge the ESD 210 or is otherwise dissipated.

Figure 8:
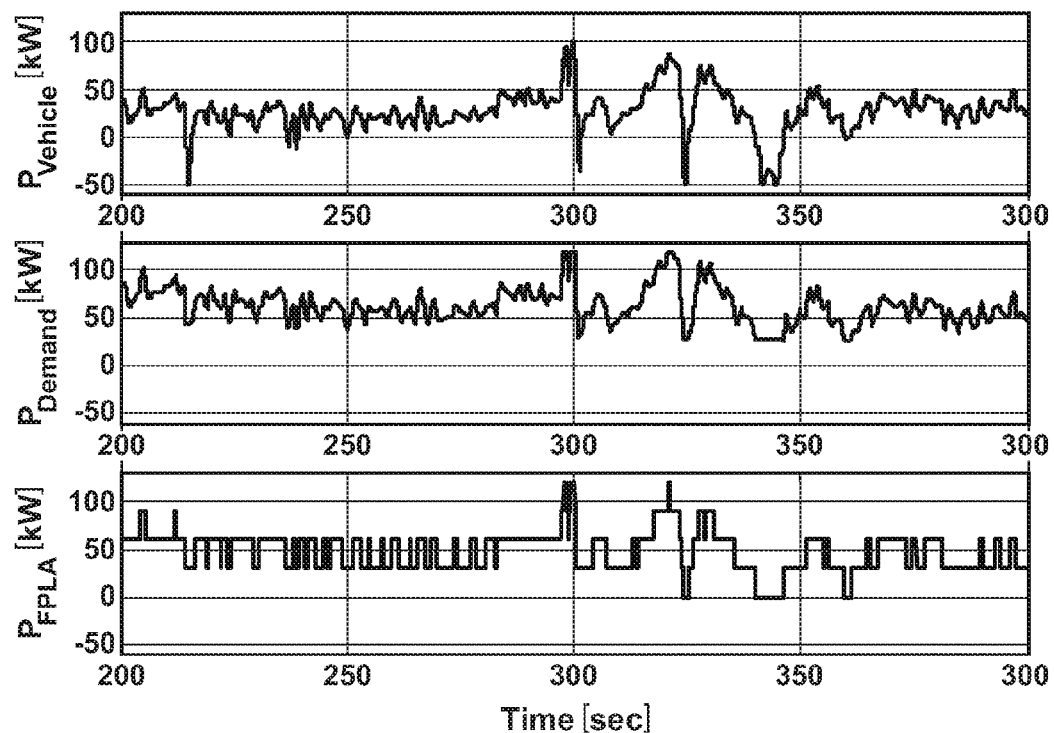

FIG. 8 shows operation of the powertrain system 200 using a second subset of the third power management strategy, wherein the number of FPLAs 240 in the engine-on state is determined based upon the operator torque request ($P_{Demand}$), with the total output power from the operating FPLAs 240 ($P_{FPLA}$) controlled to be less than the required mechanical power associated with the operator torque request ($P_{Demand}$), with the output power to the vehicle ($P_{Vehicle}$) adjusted based upon efficiencies of the torque machine(s) 230 in converting electrical power to mechanical power.

A third subset of the third power management strategy for operating the powertrain system 200 to generate tractive torque to achieve an instantaneous power demand that is responsive to an operator torque request includes operating each of the FPLAs 240 of the powertrain system 200 in one of the engine-on (ON) state and the engine-off (OFF) state, with each of the FPLAs 240 operating at its resonant speed and at its rated output power. In one embodiment, the FPLAs 240A, 240B, 240C, and 240D are configured to generate different, progressive amounts of rated output power. Thus, in one embodiment the first FPLA 240A has a rated output power of 10 kW, the second FPLA 240B has a rated output power of 20 kW, the third FPLA has a rated output power of 30 kW, and the fourth FPLA 240D has a rated output power of 40 kW for a total output power of 100 kW of power. The output power from the FPLAs 240A, 240B, 240C, and 240D can increase from zero to 100 kW in increments of 10 kW by selective operation thereof. Thus, there is a corresponding output power of 0 kW when all of the FPLAs 240 are in the engine-off state, a corresponding output power of 10 kW when only the first FPLA 240A is in the engine-on state, a corresponding output power of 20 kW when only the second FPLA 240B is in the engine-on state, a corresponding output power of 30 kW when only the third FPLA 240C is in the engine-on state, a corresponding output power of 40 kW when only the fourth FPLA 240D is in the engine-on state. The output power progresses by increments of 10 kW to 100 kW of output power by selectively operating one or more of the FPLAs 240A, 240B, 240C, and 240D.

A fourth subset of the third power management strategy for operating the powertrain system 200 to generate tractive torque to achieve an instantaneous power demand that is responsive to an operator torque request includes operating each of the FPLAs 240 of the powertrain system 200 in one of the engine-on (ON) state and the engine-off (OFF) state, with each of the FPLAs 240 operating in the engine-on state to generate a selected discrete level of output power. The selectable discrete levels of generated output power each include a predetermined output power which each FPLA 240 can generate. The selectable discrete levels of output power are preferably predetermined fractions of the rated output power, e.g., 33%, 66% and 100% of the rated output power, including 10 kW, 20 kW, and 30 kW in one embodiment. Each FPLA 240 generates the selectable discrete levels of output power by controlling mass of fuel injected each combustion cycle and are preferably associated with a resonant speed of the FPLA 240. Thus, in one embodiment the generated output power from the FPLAs 240A, 240B, 240C, and 240D can increase from zero to 120 kW in increments of 10 kW by controlling engine states thereof, i.e., one of engine-on and engine-off, and controlling the discrete levels of output power therefrom. Thus, there is a corresponding output power of 0 kW when all of the FPLAs 240 are in the engine-off state, a corresponding output power of 10 kW when only the first FPLA 240A is in the engine-on state and operating to generate a discrete output power of 10 kW, a corresponding output power of 20 kW when the first FPLA 240A is in the engine-on state and is operating to generate a discrete output power of 20 kW, a corresponding output power of 30 kW when the first FPLA 240A is in the engine-on state and is operating to generate a discrete output power of 30 kW, etc. The generated output power progresses by increments of 10 kW to 120 kW of output power by selectively operating one or more of the FPLAs 240A, 240B, 240C, and 240D, and controlling the generated output power therefrom in increments of 10 kW. The FPLAs 240A, 240B, 240C, and 240D have different electrical efficiency levels when operating at the three different discrete power levels. In one embodiment, the three power levels and corresponding electrical efficiencies are 10 kW with 92% efficiency, 20 kW with 85% efficiency, and 30 kW with 80% efficiency. Thus, the control scheme preferentially selectively operates the FPLAs 240A, 240B, 240C, and 240D to maximize efficiency and power. One embodiment of this power management strategy is shown with reference to Table 1.

TABLE 1

| Power Output (kW) | | | | |
|---|---|---|---|---|
| FPLA 240A (kW) | FPLA 240B (kW) | FPLA 240C (kW) | FPLA 240D (kW) | Total Output power (kW) |
| 0 | 0 | 0 | 0 | 0 |
| 10 | 0 | 0 | 0 | 10 |
| 20 | 0 | 0 | 0 | 20 |
| 30 | 0 | 0 | 0 | 30 |
| 30 | 10 | 0 | 0 | 40 |
| 30 | 20 | 0 | 0 | 50 |
| 30 | 30 | 0 | 0 | 60 |
| 30 | 30 | 10 | 0 | 70 |
| 30 | 30 | 20 | 0 | 80 |
| 30 | 30 | 30 | 0 | 90 |
| 30 | 30 | 30 | 10 | 100 |
| 30 | 30 | 30 | 20 | 110 |
| 30 | 30 | 30 | 30 | 120 |

The total output power generated by the FPLAs 240A, 240B, 240C, and 240D can be used to track the operator torque request, with excess power generated being used to charge the ESD 210. The ESD 210 can be sized appropriately, with minimal need for excess capacity associated with charging and discharging since most of the instantaneous power demand is achieved directly using the FPLAs 240A, 240B, 240C, and 240D.

In operation the hybrid controller 120 monitors SOC of the ESD 210 relative to its discharging and charging power limits and the instantaneous power demand. When the discharging power limit of the battery is less than the instantaneous power demand, the hybrid controller 120 selectively operates the FPLAs 240A, 240B, 240C, and 240D in the engine-on state. When the battery reaches a low threshold for SOC, e.g., 0.3, the hybrid controller 120 switches into charging mode, during which total power is supplied by the FPLAs 240A, 240B, 240C, and 240D. The total power requested from the FPLAs 240A, 240B, 240C, and 240D is equal to the sum of the vehicle power demand and the instantaneous charging power limit of the ESD 210, taking into account mechanical efficiencies, electrical power transmission losses, and other factors. The hybrid controller 120 operates in the charging mode until the ESD 210 achieves the upper SOC limit, e.g., 0.8 is reached. At that time, all power is provided by the ESD 210 and the FPLAs 240A, 240B, 240C, and 240D are only switched on when the battery cannot satisfy the vehicle power demand or the low SOC limit is reached again.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Hybrid powertrain system, comprising:
an electrical energy storage device;
an electrically-powered torque machine configured to generate torque transferable to a driveline and react torque from the driveline;
a plurality of reciprocating free-piston internal combustion engines each including a linear alternator device configured to generate electric power when in an engine-on state, each reciprocating free-piston internal combustion engine configured to generate a rated output power differing from rated output powers of the other reciprocating free-piston internal combustion engines when operating at resonant speeds;
a power electronics circuit configured to transfer electric power between each of the linear alternator devices, the electrical energy storage device and the torque machine; and
a control module configured to
determine mechanical and electrical power demands responsive to an operator torque request and a state of charge of the electrical energy storage device,
command operation of the torque machine to generate an output torque responsive to the mechanical power demands, and
command operations of the reciprocating free-piston internal combustion engines to generate electric power responsive to the electrical power demands.

2. The hybrid powertrain system of claim 1, wherein commanding operations of the reciprocating free-piston internal combustion engines to generate electric power responsive to the electrical power demands comprises a power management strategy including individually commanding operations of each of the reciprocating free-piston internal combustion engines over a range of output powers from a minimum electric power to a maximum electric power to generate electric power responsive to the electrical power demands.

3. The hybrid powertrain system of claim 1, wherein commanding operations of the reciprocating free-piston internal combustion engines to generate electric power responsive to the electrical power demands comprises a power management strategy including commanding simultaneous operation of all of the reciprocating free-piston internal combustion engines in one of the engine-on state and an engine-off state.

4. The hybrid powertrain system of claim 1, wherein commanding operations of the reciprocating free-piston internal combustion engines to generate electric power responsive to the electrical power demands comprises a power management strategy including commanding individual operation of each of the reciprocating free-piston internal combustion engines in one of the engine-on state and an engine-off state.

5. The hybrid powertrain system of claim 4, wherein the individual operation of each of the reciprocating free-piston internal combustion engines includes individual operation in the engine-on state at the rated output power.

6. The hybrid powertrain system of claim 4, wherein the individual operation of each of the reciprocating free-piston internal combustion engines includes individual operation in the engine-on state at the resonant speed and at the rated output power.

7. The hybrid powertrain system of claim 4, wherein the individual operation of each of the reciprocating free-piston internal combustion engines includes individual operation in the engine-on state at a predetermined fraction of the rated output power.

8. The hybrid powertrain system of claim 4, wherein the individual operation of each of the reciprocating free-piston internal combustion engines includes operation of selected ones of the reciprocating free-piston internal combustion engines to generate a total electric power that is greater than a required mechanical power associated with the operator torque request.

9. The hybrid powertrain system of claim 4, wherein the individual operation of each of the reciprocating free-piston internal combustion engines includes operation of selected ones of the reciprocating free-piston internal combustion engines to generate a total electric power that is less than a required mechanical power associated with the operator torque request.

10. The hybrid powertrain system of claim 1, wherein each reciprocating free-piston internal combustion engine configured to generate a rated output power differing from rated output powers of the other reciprocating free-piston internal combustion engines when operating at resonant speeds comprises a first of said engines configured to generate a rated output power of 10 kW, a second of said engines configured to generate a rated output power of 20 kW, a third of said engines configured to generate a rated output power of 30 kW, and a fourth of said engines configured to generate a rated output power of 40 kW.

11. The hybrid powertrain system of claim 1, wherein each reciprocating free-piston internal combustion engine configured to generate a rated output power differing from rated output powers of the other reciprocating free-piston internal combustion engines when operating at resonant speeds comprises said engines configured with varying engine design factors including cylinder bore and stroke.

12. The hybrid powertrain system of claim 1, wherein each reciprocating free-piston internal combustion engine configured to generate rated output power differing from rated output powers of the other reciprocating free-piston internal combustion engines when operating at resonant speeds comprises said engines configured with varying engine design factors including piston size and mass.

13. Hybrid powertrain system, comprising:
an electrical energy storage device;
a plurality of electrically-powered torque machines configured to generate and react mechanical torque;
a plurality of reciprocating free-piston internal combustion engines each including a linear alternator device configured to generate electric power, each reciprocating free-piston internal combustion engine configured to generate a rated output power differing from rated output powers of the other reciprocating free-piston internal combustion engines when operating at resonant speeds;
a power electronics circuit configured to transfer electric power between each of the linear alternator devices, the electrical energy storage device and the torque machines; and
a control module configured to
determine mechanical and electrical power demands responsive to an operator torque request and a state of charge of the electrical energy storage device,
command operation of the torque machines to generate torque responsive to the mechanical power demands, and
command operations of the reciprocating free-piston internal combustion engines to generate electric power responsive to the electrical power demands.

14. Hybrid powertrain system, comprising:
an electrical energy storage device;
an electrically-powered torque machine configured to generate torque transferable to a driveline and react torque from the driveline;
a plurality of reciprocating free-piston internal combustion engines each including a linear alternator device configured to generate electric power, each reciprocating free-piston internal combustion engine configured to generate a rated output power differing from rated output powers of the other reciprocating free-piston internal combustion engines when operating at resonant speeds;
a power electronics circuit configured to transfer electric power between each of the linear alternator devices, the electrical energy storage device and the torque machine; and
a control module configured to
determine electrical power demands responsive to an operator torque request and a state of charge of the electrical energy storage device, and
command operations of the reciprocating free-piston internal combustion engines to generate electric power responsive to the electrical power demands.

15. The hybrid powertrain system of claim 14, wherein commanding operations of the reciprocating free-piston internal combustion engines to generate electric power responsive to the electrical power demands comprises a power management strategy including individually commanding operations of each of the reciprocating free-piston internal combustion engines over a range of output powers from a minimum electric power to a maximum electric power to generate electric power responsive to the electrical power demands.

16. The hybrid powertrain system of claim 14, wherein commanding operations of the reciprocating free-piston internal combustion engines to generate electric power responsive to the electrical power demands comprises a power management strategy including commanding simultaneous operation of all of the reciprocating free-piston internal combustion engines in one of the engine-on state and an engine-off state during operation of the hybrid powertrain system.

17. The hybrid powertrain system of claim 14, wherein commanding operations of the reciprocating free-piston internal combustion engines to generate electric power responsive to the electrical power demands comprises a power management strategy including commanding individual operation of each of the reciprocating free-piston internal combustion engines in one of the engine-on state and an engine-off state during operation of the hybrid powertrain system.

18. The hybrid powertrain system of claim 17, wherein the individual operation of each of the reciprocating free-piston internal combustion engines includes individual operation in the engine-on state at the rated output powers.

19. The hybrid powertrain system of claim 17, wherein the individual operation of each of the reciprocating free-piston internal combustion engines includes individual operation in the engine-on state at the resonant speed and at the rated output power.

* * * * *